United States Patent [19]

Heath

[11] Patent Number: 4,511,374
[45] Date of Patent: Apr. 16, 1985

[54] GAS TEMPERATURE CONTROL SYSTEM FOR NATURAL GAS SEPARATOR

[76] Inventor: Rodney T. Heath, 109 W. 31st, Farmington, N. Mex. 87401

[21] Appl. No.: 581,341

[22] Filed: Feb. 17, 1984

[51] Int. Cl.³ .............................................. B61D 19/00
[52] U.S. Cl. .......................................... 55/20; 55/32; 55/174; 55/160
[58] Field of Search ....................... 55/20, 32, 45, 217, 55/171–177, 269, 160

[56] References Cited

U.S. PATENT DOCUMENTS

| | | | |
|---|---|---|---|
| 3,119,674 | 1/1964 | Glasgow et al. | 55/20 |
| 3,174,926 | 3/1965 | Walker et al. | 55/174 |
| 4,198,214 | 4/1980 | Heath | 55/20 |
| 4,342,572 | 8/1982 | Heath | 55/174 X |

*Primary Examiner*—Charles Hart
*Attorney, Agent, or Firm*—Klaas & Law

[57] ABSTRACT

A gas treater having a control system for maintaining an optimum operating temperature in a separator gas section while simultaneously maintaining a much higher temperature in a heating unit bath which is used to preheat well effluent entering the separator.

6 Claims, 1 Drawing Figure

GAS TEMPERATURE CONTROL SYSTEM FOR NATURAL GAS SEPARATOR

BACKGROUND OF THE INVENTION

The present invention relates generally to thermal circulation gas treaters and more particularly to a thermal circulating gas treater having a system for controlling and optimizing the gas temperature in a high pressure separator. The effluent from a petroleum or gas well may contain oil and gas, with some of the oil and/or water emulsified with the gas, and under certain conditions, with the water forming hydrates. A common way to treat the connate well fluids has been to heat them to a predetermined temperature, to aid in breaking the emulsions and hydrates for the separation of gas from the oil or liquified hydrocarbons at the separation temperature. The heating of the well streams is usually performed at or near the well head by equipment that must be automatic, as the well heads may only be rarely visited by the producer's workers. Some problems occur with the heating of well streams, as a controlled temperature is highly desirable, and overheating or underheating are detrimental to the treatment process.

One method of treating the heated well stream is to pass it through a high pressure separator. The high pressure separator generally comprises an elongate closed tank wherein effluent introduced at an upper portion of one end thereof is separated into a separator liquid which collects in a lower portion of the tank and a gas which collects above the separated liquid. It is conventional to control the temperature of the liquid collected in the separator by a separator heating coil. The separator heating coil is located in a lower portion of the separator where it is immersed in the separator liquid and supplies heat thereto. A heating medium flowing through the separator heating coil is heated by a heating unit. The amount of heat provided to the separator liquid by the separator heating coil is dependent on the flow rate and temperature of the heating medium through the coil. Various means may be employed controlling this heating medium flow rate, such as a controlled heat siphon as described in U.S. Pat. Nos. 4,342,572 and 4,198,214 of Rodney T. Heath which are hereby incorporated by reference for all that is contained therein.

It is also conventional for separator heat control systems to control the temperature of the effluent entering the separator by preheating the effluent. One method of preheating the effluent is to pass it through a coil in a heated liquid bath. Apparatus of this type is described in U.S. patent application Ser. No. 537,298 filed Sept. 29, 1983 by Rodney T. Heath, which is hereby incorporated by reference for all that it contains. Other methods such as conventional pumping, etc. may also be used in systems.

A supply (control and fuel) gas system is provided which provides fuel to the heater burner and which also provides control gas to various separator controls. The supply gas is supplied by gas from the high pressure separator which must undergo substantial pressure reduction from line pressure of e.g. 1500 psig to a gas supply pressure of about e.g. 30 psig to 1 psig. This pressure reduction produces substantial cooling in the supply gas and thus the supply gas is passed through a coil in the heater bath to prevent it from freezing as a result of the pressure reductions. It is generally desirable to maintain the liquid bath in the heater at an elevated temperature, especially in extremely cold weather conditions to prevent the supply gas regulators from freezing.

It is further desirable to maintain the heat of the liquid bath in the heating unit at a relatively high temperature for heating efficiency. However, the temperature/pressure head of well effluent passing through this type of heating coil is variable, due to well head flowing conditions and weather conditions. In order to compensate for these differences in well effluent head and maintain a constant separation temperature, conventional units have varied the temperature of the liquid bath in which the effluent heating coil is immersed. A problem with this type of control is that it is rather slow in response due to the time that it takes to heat or cool the liquid bath. Another problem is that varying the temperature of a large liquid bath over a wide temperature range is not thermally efficient. Still another problem is that if the bath temperature becomes too low, there is not enough heat in the bath to treat the hydrocarbons and water which may be contained in the separator liquid bath or to prevent possible freezing of the associated supply gas system.

OBJECTS OF THE INVENTION

It is an object of the present invention to provide a well effluent treater heating control system for maintaining the well effluent introduced into a separator within an optimum temperature range. It is a further object of the invention to provide a well effluent treater heating system having the capability to respond relatively quickly to well effluent flow variations. It is another object of the invention to provide a well effluent treater heating system which is energy-efficient to operate. It is yet another object of the invention to provide a well effluent treater heating system capable of efficient and automatic operation between extreme ambient temperature variations. It is still another object of the invention to provide a well effluent treater wherein the heater heating medium is maintained at a relatively high temperature in relation to the optimum separating temperature of the effluent during most operating conditions. It is another object to prevent reduction of the temperature of the supply gas to a level whereat the equipment will become inoperative because of freezing of supply regulator means in the system.

SUMMARY OF THE INVENTION

A treater apparatus for receiving separating and processing well effluent comprising an effluent supply means for providing a well effluent flow; heater fluid bath means for providing a heat transfer medium for heating well effluent; heater heat source means for heating said fluid bath means; heater first coil means for passing well gas therethrough in heat exchanging relationship with said fluid bath, said heater first coil means having an inlet connected with said well effluent supply means for receiving relatively low temperature effluent flow and having an outlet for discharging relatively high temperature effluent flow; mixing valve means for adjustably mixing said relatively low temperature effluent received at said first coil means inlet with said relatively high temperature effluent received at said first coil means outlet and for discharging a relatively intermediate temperature effluent for controlling the temperature of said effluent discharged therefrom, said mixing valve having a first operating state when both said relatively low temperature and said relatively high temperature effluent are controllingly received and mixed and a second operating state when only said relatively low temperature gas is received and a third operating state wherein only said relatively high temperature effluent is received; separator means in fluid communication with said mixing valve means for processing said well effluent therein and having a gas section portion and a liquid pool portion; first thermostat means in said separator gas section set at a predetermined optimum separator gas section operating temperature for controlling said mixing valve means to provide effluent to said separator means at said optimum separator operating temperature when said mixing valve means is in said first operating state; second thermostat means in said separator gas section set to be actuated at a predetermined temperature above said optimum separator gas section operating temperature to controllingly adjust said heater heat source means to lower the temperature of said fluid bath means to thereby lower the temperature of said effluent entering said separator means gas section when said mixing valve is in said second operating state.

DETAILED DESCRIPTION OF THE INVENTION

Figure 1:
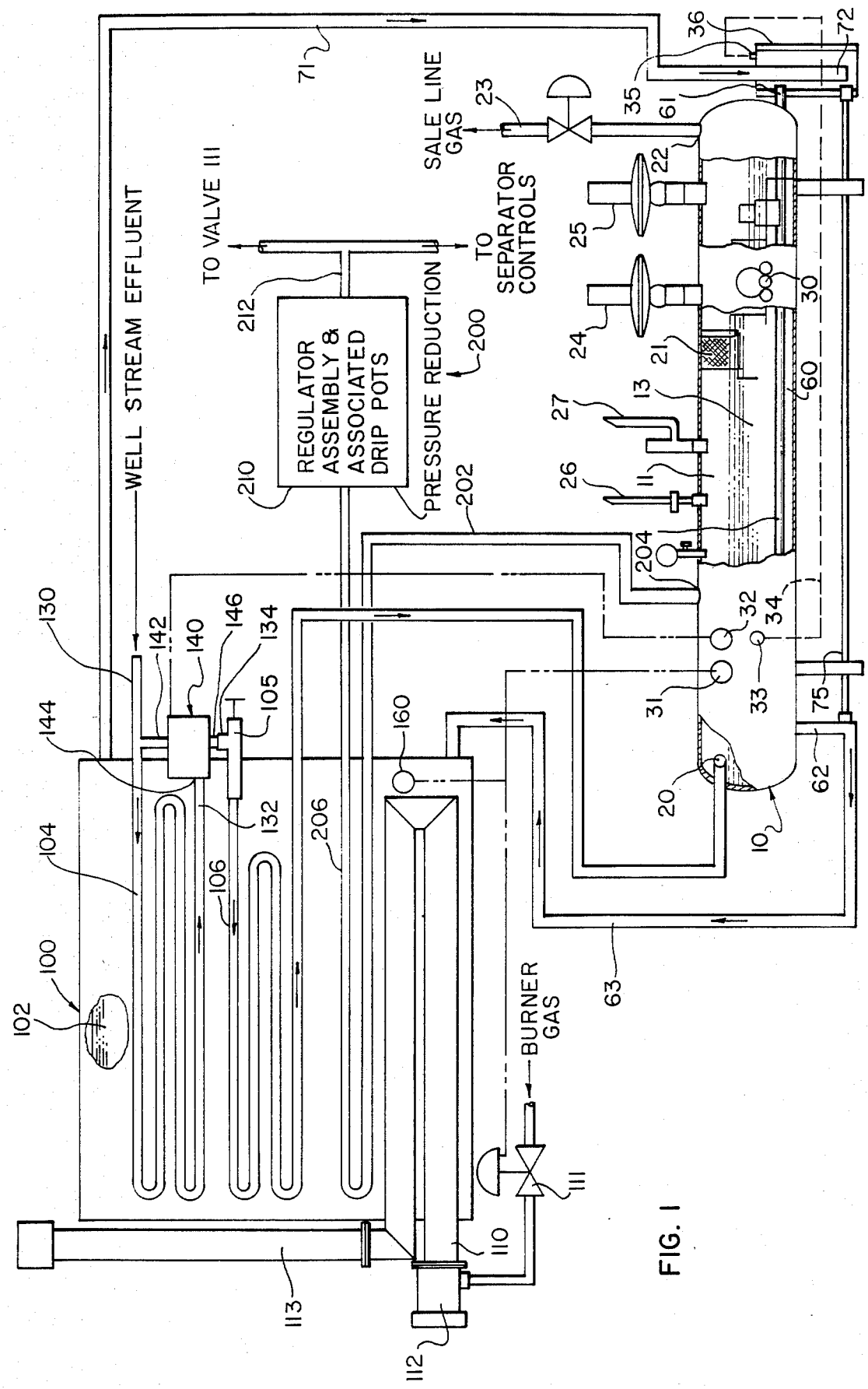
FIG. 1 is an illustration of a well effluent treater of the present invention.

It may be seen from FIG. 1 that the two major structural components of the well effluent treater of the present invention are a separator unit and a heating unit.

The high pressure separator operates to mechanically separate the gas and liquid components of well effluent at a predetermined operating temperature and pressure. Typically the gas-liquid mixture introduced into high pressure separator 10 will be at a pressure of from about 1,000 psig to about 500 psig with an optimum temperature of between about 75° F. and about 85° F., depending on pressure conditions and effluent properties.

The separator unit includes a separator tank 10 having a well effluent inlet 20 for introducing the effluent into the tank where liquid is separated from gas. Gas collects in a gas section 11 at the top of the tank and passes through a demister 21 and subsequently through outlet 22 into a sales gas line 23. Liquid hydrocarbons and water separated from the well effluent, gather in a liquid pool 13 in the lower portion of tank 10 and is released from the tank by liquid dump valves 24 and 25, as are commonly used in the industry. A rupture head 26 and relief valve 27 provide essentially standard safety measures for the tank. A conventional liquid level control assembly 30 controls operation of the dump valves 24, 25. Thermostats 31 and 32, positioned in gas section 11 above the liquid pool 13, provide means for regulating the temperature in the gas section 11, as described in further detail hereinafter. A thermostatic control valve 33, which senses the temperature in the liquid pool 13, provides a small flow of gas through a line 34 to a gas injector 35 and into a seal pot 36.

In general, operation of the separator gas from the well enters the separator 10 through inlet 20. The gas is separated from the liquids by gravity and mechanical action. The liquids are further separated, if necessary, into their respective phases (oil and water) by a conventional weir into an oil box (not shown) and a water box (not shown). The liquids are removed and are passed through valves 24 and 25 to a tank (not shown) or pit (not shown). The gas flows through the mist extractor 21 into outlet 22 and to a sales line 23.

The liquid in the high pressure separator may be heated by a heating glycol circulating system. The system includes a separator heater coil 60 passing through the lower portion of the tank 10. The coil 60 has an inlet 61 communicating with the seal pot 36 and an outlet 62 communicating through glycol return line 63 with heater unit 100. Glycol in flow line 71 is connected to the upper portion of the heater and terminates in an open end 72 in the closed seal pot 36. The seal pot 36 has a by-pass line 75, of substantially smaller cross-section than the coil 60 which communicates with the outlet 62.

The temperature of the liquids in the separator 10 is controlled by the thermostatic valve 33 (a commonly used type found on remote, self-contained oil field equipment). This thermostat operates by outputting a small quantity of gas as a signal. The gas is supplied by a low pressure regulator (not shown) in conjunction with other pneumatically operated process control devices normally installed on the separator 10. When the temperature of liquid in the separator 10 is below the desired operating temperature, the regulating gas pressure on the seal pot is reduced to allow the liquid level in the seal pot 36 to rise and fill the glycol heating coil 60 whereby maximum heat exchange between the heating glycol 102 and the well stream liquids 13 in separator tank 10 is achieved. When the liquid 13 temperature in the separator 10 is at the desired temperature, e.g. 110° F., the thermostat outputs a predetermined gas pressure, e.g. approximately 22 ounces, to the seal pot 36 where the gas pressure depresses the liquid height in seal pot 36 reducing the glycol flow to coil 60 in the separator 10. The small amount of low pressure gas used to modulate the seal pot 36 fluid level is injected into the seal pot 36 by the injector 35. As the level of heating glycol in the seal pot 36 is depressed, only a sufficient quantity of heating glycol flows through the coil 60 to maintain the desired temperature in the separator 10. When the temperature of liquid 13 exceeds the desired temperature and thus does not require any additional heat, sufficient gas is injected into the seal pot 36 to depress the heating glycol level below the inlet 61 so that no heating glycol flows through the coil 60. The by-pass line 75 maintains a small flow of heating glycol to maintain the heat syphon in flowing operation so that heated glycol is immediately available for the coil 60, when required. When the coil 60 requires heat again, the resulting gas pressure in the seal pot 36 is reduced by venting back through the thermostat 33 to allow seal pot 36 to again fill with liquid. Thus, a system is provided for maintaining the liquid 13 in the separator at or near an optimum temperature.

The well effluent treater of the present invention shown in FIG. 1 also includes a system for controlling the temperature of the well effluent prior to its entrance into the separator which allows the effluent to be discharged into the separator at or near the optimum separator operating the temperature and prevents lowering of temperature of an effluent heating bath 12, which also heats the supply gas of the system, to a lowered temperature whereat the supply gas operated controls of the system are adversely affected. A heater 100 has an effluent flow heat exchanging coil means into which the gaseous product from a well-head are introduced. The well-head gases are conveyed via the coil means, which may comprise interconnected gas heating coils 104 and 106, which are immersed in a heating medium bath 102, which may be a glycol and water solution. The heating medium bath 102 is also used in the previously described separator liquid heating system. It provides the heating medium which is circulated through lines 71, seal pot 36, separator coil 60 and return line 63 to control the heat in separator liquid bath 13. The heating medium 102 can be heated by means of a conventional fire tube heater 110. The fire tube heater is controlled by a thermostatically controlled valve 111 connected to a gas burner unit 112 in turn connected to one end of the fire tube heater. The opposite end of the fire tube heater is connected to a flue or stack 113.

A conventional choke valve 105 is positioned in the well effluent flow immediately upstream of effluent heating coil 106 and is used to reduce well head pressure to a pressure compatible with the operating pressure of separator 10 and sales gas line 26. A conventional mixing valve 140 having a first inlet orifice 142 in communication with the gas effluent inlet 130, a second inlet orifice 144 in fluid communication with first gas flow heat exchanging coil 104 outlet 132, and an outlet 146 in fluid communication with choke valve 105 inlet 134 is provided for controllably mixing relatively low temperature gas flow e.g. 70° F. from gas effluent inlet 130 with relatively high temperature gas flow, e.g. 100° F. from first coil outlet 132 to provide a selected intermediate temperature gas flow from outlet orifice 146. The temperature of the gas flow from outlet orifice 146 is controlled by controlling the mixture ratio of the two inlet gases by adjustably controlling the amount of opening of inlets 142 and 144. A valve for accomplishing this mixing function is commercially available as part number Cemco 250-DS 3W-S and the name "Splitter Valve" from Custom Engineering and Manufacturing Corporation of 1120 North Peoria, Tulsa, Okla. By controlling the temperature of the gas at orifice 146 the temperature of the gas delivered to separator tank inlet 20 may also be controlled. Thus, within certain operating parameters, the gas temperature in gas section 11 may be maintained at an optimum value by continuously adjusting the gas temperature at mixing valve outlet 146. The means for providing this control includes thermostat 32 located within gas section 11 which is set at the optimum gas operating temperature e.g. 80° F. If the gas temperature in gas section 11 falls below the optimum temperature, the mixing valve effluent mixing ratio is changed to increase the amount of flow from coil 104 to valve inlet 144 and to decrease the flow into inlet 142. If the gas temperature in gas section 11 increases above the optimum temperature then the amount of flow into inlet 142 is increased and the amount of flow into inlet 144 is decreased.

However, it may be seen that the operation of thermostat 32 and mixing valve 140 to provide an optimum gas temperature in gas section 11 is dependent upon (1) the temperature of the gas entering inlet 142; (2) the temperature of the gas entering inlet 144; (3) the amount of heat loss through choke valve 105; and (4) the amount of heat added to the effluent by passage thereof through second heating coil 106. At the extreme low temperature limit of its operating range (i.e. the valve configuration which causes the least amount of heat to be added to the effluent), the mixing valve will mix 100% inlet 142 effluent and 0% inlet 144 effluent. At the extreme high temperature limit of its operation, valve 140 mixes 100% inlet 144 effluent with 0% inlet 142 effluent. Thus, it may be seen that after valve 140 has reached either the low or high limit of its operating range, it may not effect further changes in the temperature of the effluent leaving outlet 146. Further temperature change at outlet 134 after valve 140 reaches its limit in either direction may only take place by changing the temperature of heater bath 102. By raising or lowering the temperature of bath 102, the temperature of the gas at outlet 146 and thus at separator inlet 20 will be correspondingly raised or lowered.

A second conventional temperature sensing control means 31 may thus be provided in the gas section 11 for controlling the temperature of bath 102 through control of thermostatically controlled valve 111. In a preferred embodiment, the temperature setting of the bath 102 controlling thermostat 31 is set a few degrees higher, e.g. 5° F. higher, than the mixing valve controlling thermostat 32. Thus, if the temperature in dome 11 rises to the temperature setting, e.g. 85° F. of thermostat 31, the thermostat sends a signal to valve 111 to reduce or shut off burner 112 operation. Thus, thermostat 32 and valve 140 will be operational within certain ranges of parameters (depending on effluent flow rate, effluent inlet temperature, bath temperature) to hold the gas section temperature at the optimum and, if the system goes beyond these ranges, self-correcting action is commenced by either raising or lowering the bath 102 temperature. Under normal working conditions, the system will operate within the valve 140 parameters and thus the bath temperature will be maintained at a predetermined temperature of approximately 190° F., by a thermostat 160 located in the bath 102. Thermostat 160 is set to override thermostat 31 to turn off burner 112 whenever the predetermined maximum bath temperature, e.g. 190° F., is reached regardless of the gas section 11 temperature. Thus, bath temperature overheating is prevented.

A conventional supply gas system schematically represented at 200 is provided and comprises a separator connection 202 conduit having an inlet 204 in communication with gas section 11, a fuel gas coil 206 positioned within heater bath 102 and communicating with conduit 202, a pressure reduction assembly and associated drip pot 210 in communication with the fuel gas coil 206 outlet and discharge conduits 212 for providing fuel gas to burner 112 and separator controls 214. In the above described system, unless the bath 102 is maintained at a high enough temperature, the control devices may freeze under low ambient temperature conditions, e.g. blizzard-type conditions.

Thus, it may be seen that two separator temperature control systems are provided. One system controls the temperature of separator liquid pool 13 within predetermined values, e.g. 80° F. to 120° F. by changing the flow rate of heating medium through separator coil 60. The other separator temperature control system controls the temperature of effluent entering the separator by mixing a pre-heated effluent gas flow with an unheated effluent gas flow and secondarily, by controlling the temperature of the heating medium used to heat effluent gas flow prior to its discharge into the separator 10.

The primary function of the present temperature control system is to maintain and control the temperature of the bath liquid 102 in tank 100 at an elevated temperature above the optimum separation temperature of separator 10. As a consequence, the temperature of the liquids in the separator tank 10 is properly controlled by passage of the bath liquid through heating coil 60 therein. In addition, the temperature of the gas in the gas section of the separator tank is also properly controlled. Furthermore, the supply gas is maintained at the proper operating temperature. Thus, the three-fold result is that all parts of the system remain operable at all times and under all conditions.

It is contemplated that the inventive concepts herein described may be variously otherwise embodied. For example, as an alternative embodiment (not shown), inlet passage of coil means 104 is connected to the outlet passage of coil to effluent line 130 and means 104 may be connected directly to the choke means 105 with control valve means 140 located downstream of the choke means, a control valve outlet passage means directly connected to the separator means inlet line 120, and a control valve inlet passage means connected to a choke passage outlet means through the second heater coil means 106. It is intended that the appended claims be construed to include alternative embodiments of the invention except insofar as limited by the prior art.

What is claimed is:

1. A heating control system for an effluent treating apparatus of the type including a high pressure separator which receives effluent to be separated in a gas section thereof from an effluent supply line, the control system comprising:
   (a) preheating means for preheating well effluent in the well effluent supply source;
   (b) mixing valve means for mixing a relatively low temperature effluent flow from a portion of the effluent supply line upstream of the preheater with a relatively high temperature effluent flow from a portion of the supply line downstream of the effluent heater for providing a valve discharge effluent flow to the separator at a controlled temperature; and
   (c) thermostat means operatively associated with the separator gas section for selectively controlling the mixing of said relatively high temperature effluent flow with said relatively low temperature effluent flow to provide an effluent flow to the separator gas section of a predetermined temperature during a first operating state;
   (d) second thermostat means operably associated with said separator gas section and actuatable at a predetermined override temperature above said predetermined operating temperature of said separator for controlling the temperature of a liquid bath in said preheating means used to preheat said well effluent supply line, during a second operating state;
   (e) third thermostat means operably associated with said liquid bath in said preheating means for controling said preheating means to maintain a substantially constant, preset, maximum operating temperature in said liquid bath during said first operating state and to be overridden by said second thermostat means during said second operating state whereby said temperature of said liquid bath is variably controllable at temperatures below said maximum preset temperature during said second operating state and whereby said temperature of said liquid bath is maintained substantially at said preset maximum temperature during said first operating state.

2. A treater apparatus for receiving separating and processing well effluent comprising:
   (a) effluent supply means for providing a well effluent flow;
   (b) heater fluid bath means for providing a heat transfer medium for heating well effluent;
   (c) heater heat source means for heating said fluid bath means;
   (d) heater first coil means for passing well gas therethrough in heat exchanging relationship with said fluid bath, said heater first coil means having an inlet connected with said well effluent supply means for receiving relatively low temperature effluent flow and having an outlet for discharging relatively high temperature effluent flow;
   (e) mixing valve means for adjustably mixing said relatively low temperature effluent received at said first coil means inlet with said relatively high temperature effluent received at said first coil means outlet and for discharging a relatively intermediate temperature effluent for controlling the temperature of said effluent discharged therefrom, said mixing valve having a first operating state when both said relatively low temperature and said relatively high temperature effluent are controllingly received and mixed and a second operating state when only said relatively low temperature effluent is received; and a third operating state wherein only said relatively high temperature effluent is received;
   (f) separator means in fluid communication with said mixing valve means for processing said well effluent therein and having a gas section portion and a liquid pool portion;
   (g) first thermostat means in said separator gas section set at a predetermined optimum separator gas section operating temperature for controlling said mixing valve means to provide effluent to said separator means at said optimum separator operating temperature when said mixing valve means is in said first operating state; and
   (h) second thermostat means in said separator gas section set to be actuated at a predetermined temperature above said optimum separator gas section operating temperature to controllingly adjust said heater heat source means to lower the temperature of said fluid bath means to thereby lower the temperature of said effluent entering said separator means gas section when said mixing valve is in said second operating state;
   (i) third thermostat means in said heater fluid bath means for maintaining the temperature of said fluid bath means at a preset maximum temperature in said first and third operating states and for being overridden by said second thermostat means in said second operating state.

3. A heating system for a natural well gas separator apparatus having a first separator vessel means containing a body of liquids and a body of natural gas during a liquid-gas separation process and comprising:
   a heating vessel means for holding a supply of a fluid heating medium;
   a gas operated heating means operatively associated with said heating vessel means for heating the fluid heating medium therein;
   supply gas means obtained from the separator apparatus for providing supply gas to said burner means and providing the source of fuel therefor and having a portion located in said heating vessel means for heating supply gas;

a heat transfer conduit means in the separator vessel and located within the body of liquids therein for receiving the fluid heating medium from said heating vessel means and heating the body of liquids;

heat transfer conduit means in said heating vessel in heat transfer relationship with the fluid heating medium therein receiving well effluent from a well and for heating well effluent and having an inlet portion and an outlet portion;

well effluent supply conduit means connected to said inlet portion of said heat transfer conduit means in said heating vessel for delivery of well effluent thereto for heating therein to provide a supply of heated well effluent for delivery to the separator vessel;

heated well effluent supply conduit means connected at one end to said outlet portion of said heat transfer conduit means in said heating vessel and at the other end portion to said separator vessel means for delivery of heated well effluent thereto;

primary temperature sensing control means operatively associated with said fluid heating medium in said heating vessel means and said gas operated heating means for variably controlling the amount of supply gas consumed thereby in accordance with temperature of said fluid heating medium;

choke valve means operatively associated with said heat transfer conduit means in said heating vessel for receiving relatively high pressure heated well effluent therefrom and reducing the pressure of the heated well effluent and providing relatively low pressure heated well effluent for delivery to said separator vessel means through said heated well effluent supply means;

temperature responsive flow control valve means operatively associated with said choke valve means and said heat trasnfer conduit means in said heating vessel and said heated well effluent supply means and said well effluent supply conduit means for enabling variable mixing of variable amounts of well effluent from said well effluent supply conduit means upstream of said heat transfer conduit means with variable amounts of heated well effluent downstream of said heat transfer conduit means and for terminating flow of either of the well effluent and the heated well effluent through said temperature responsive flow control valve means whereby in a first condition of operation only heated well effluent is delivered by said flow control means and in a second condition only unheated well effluent is delivered by said flow control means and in a third condition variable amounts of both heated well effluent and unheated well effluent are delivered by said flow control means; and secondary temperature sensing control means operatively associated with said body of gas in the separator vessel and said temperature responsive flow control valve means for variably controlling the temperature of the body of gas in the separator vessel by variably changing the amounts of heated well effluent and unheated well effluent delivered to the separator vessel means.

4. The invention as defined in claim 3 and wherein: said temperature responsive flow control means being located upstream of said choke means.

5. The invention as defined in claim 3 or 4 and wherein said heat transfer conduit means in said heating vessel comprises;

a first heating coil portion located between said unheated well effluent supply conduit means and said temperature responsive flow control valve means and said choke means; and a second heating coil portion located downstream of said temperature responsive flow control valve means and said choke valve means.

6. A method of controlling the temperature of a body of relatively low pressure natural gas in a separator vessel means for separating liquids and gas in a relatively high pressure natural gas well head effluent and for controlling the temperature of a fluid heating medium in an heating vessel operatively associated with a relatively low pressure gas operated heating means for heating the fluid heating medium and operatively associated with supply gas conduit means for supplying relatively low pressure fuel gas to the gas operated heating means and operatively associated with a body of liquids in the separator vessel means, the method comprising:

heating the relatively high pressure well effluent by passing the well effluent through a first and a second heating coil means located in the heating vessel in heat transfer relationship with the fluid heating medium to provide heated well effluent;

delivering the heated well effluent to the separator vessel means and separating the heated well effluent into a body of liquids and a body of gas;

controlling the temperature of the body of liquids in the separator vessel by passing the fluid heating medium through conduit means located in the separator vessel in heat transfer relationship with the body of liquids;

heating the supply gas for the gas operated heating means by passing the supply gas through conduit means located in the heating vessel in heat transfer relationship with the fluid heating medium;

controlling the temperature of the fluid heating medium in the heating vessel by temperature sensing means located in the fluid heating medium in the heating vessel means during a first and third mode of operation wherein the fluid heating medium is maintained at a preset maximum temperature and by temperature sensing means located in the separator vessel means during a second mode of operation temperature is variably controlled below the preset maximum wherein the fluid heating medium temperature is variably controlled below the preset maximum temperature; and controlling the temperature of the body of gas in the separator vessel by temperature sensing means located in the body of gas and a temperature responsive flow control means connected to the unheated well effluent upstream of the heating vessel means and the heated well effluent delivered from the first heating coil means by causing delivery to the second heating coil means of a variable mixture of unheated well effluent and heated well effluent in said first mode of operation and delivery to the second heating coil means of only unheated well effluent in said second mode of operation, and delivery to the second heating coil means of only heated well effluent in said third mode of operation, and by said variably controlling of the temperature of the fluid heating medium in the heating vessel during said second mode of operation; whereby the amount of heat transferred to effluent passing through said second coil means is variably controlled.

* * * * *